United States Patent [19]

Murai et al.

[11] Patent Number: 4,978,691

[45] Date of Patent: Dec. 18, 1990

[54] POLYCARBONATEDIOL COMPOSITION AND POLYURETHANE RESIN

[75] Inventors: Takaaki Murai; Tatsumi Fujii, both of Hiroshima, Japan

[73] Assignee: Daicel Chemical Industries, Ltd., Osaka, Japan

[21] Appl. No.: 356,909

[22] Filed: May 25, 1989

[30] Foreign Application Priority Data

May 26, 1988 [JP] Japan ................................. 63-127083
Dec. 9, 1988 [JP] Japan ................................. 63-311452

[51] Int. Cl.$^5$ .............................................. C08G 18/14
[52] U.S. Cl. .............................. 521/172; 252/182.24; 528/85; 558/265
[58] Field of Search ................... 521/172; 252/182.24; 528/85; 558/265

[56] References Cited

U.S. PATENT DOCUMENTS

| | | | |
|---|---|---|---|
| 3,879,348 | 4/1975 | Serini et al. ............................ | 260/47 |
| 4,024,113 | 5/1977 | Ammons .............................. | 260/77.5 |
| 4,101,529 | 7/1978 | Ammons .............................. | 528/67 |
| 4,103,070 | 7/1978 | Ammons .............................. | 428/412 |
| 4,105,641 | 8/1978 | Buysch et al. ...................... | 526/712 |
| 4,160,853 | 7/1979 | Ammons .............................. | 428/425 |
| 4,377,670 | 5/1983 | Krimm et al. ........................ | 528/67 |
| 4,533,729 | 8/1985 | Newland et al. .................... | 528/371 |

FOREIGN PATENT DOCUMENTS 1525933 9/1978 United Kingdom .

Primary Examiner—Maurice J. Welsh
Attorney, Agent, or Firm—Sughrue, Mion, Zinn, Macpeak & Seas

[57] ABSTRACT

A polycarbonatediol composition is disclosed having the property of being liquid at room temperature because of its crystallinity being disordered due to random structures, which comprises a mixture of 1,6-hexanediol and polyvalent alcohol having at least one side chain. Accordingly, the disclosed composition has excellent processability in the case of preparing a polyurethane resin, etc.

Further disclosed is a polyurethane resin prepared by reaction of an organic diisocyanate compound with the polycarbonatediol composition. The polyurethane resin has excellent properties under low temperature conditions, while retaining high levels of mechanical strength, excellent resistibility under high heat and moisture conditions, etc., thereby maintaining a good balance of properties. The polyurethane resin in accordance with the present invention, is useful in a very wide variety of forms, including spandex, rigid or flexible urethane foams, thermoplastic urethane elastomers and thermosetting urethane elastomers, adhesives, synthetic leather, and paints, etc.

8 Claims, No Drawings

POLYCARBONATEDIOL COMPOSITION AND POLYURETHANE RESIN

FIELD OF THE INVENTION

The present invention relates to a novel polycarbonatediol composition having the property of being liquid or easily liquified, and having excellent processability in the case of preparing a polyurethane resin, etc.

Furthermore, the present invention relates to a polyurethane resin prepared by reaction of an organic diisocyanate compound with the polycarbonatediol composition.

BACKGROUND OF THE INVENTION

Hitherto, polyurethane resins have been used in a wide variety of forms including foams, adhesives, fibers, elastomers, and paints.

They are prepared mainly by a reaction of an organic diisocyanate compound with polyol compounds.

The polyol compounds which have been employed include polyether polyols such as polypropylene glycols, polytetramethylene glycols, polyester polyols which are derived from divalent carboxylic acids such as adipic acid, and polyhydric alcohols, and polylactone polyols which are obtained by a reaction of lactones with alcohols.

A variety of polyol compounds have been used to produce polyurethane resin which is used for many kinds of purposes.

However, as polyether polyols have ether bonds, the urethane resin which is produced by employing them has the disadvantage of being poor in heat resistibility and in weatherability.

The urethane resin which is produced by employing polyester of polylactone polyols has the disadvantage of being poor in water resistibility, thought to be due to presence of ester bonds.

The use of polyols having carbonate bonds in their molecular structure has been proposed to produce novel urethane resins which overcome the foregoing disadvantages.

The polycarbonatepolyol which is used more widely than any other type of polyol compound is the polyol having a carbonate bond in the molecular structure containing 1,6-hexanediol in the main chain of the molecular structure, as shown by formula (I):

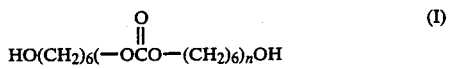
(I)

The polycarbonatediol having 1,6-hexanediol structures in the main chain can produce a polyurethane resin having a very good balance of various properties, including mechanical strength, excellent resistibility under high heat and moisture conditions, etc., thereby maintaining a good balance of properties, and has also the advantage of being easy to produce on an industrial basis.

The polycarbonatediol having 1,6-hexanediol structures the main chain, however, has a melting temperature range of 40° to 50° C., therefore, it is a relatively hard wax-like solid at ordinary temperatures.

Accordingly, it is required to be melted before use as a raw material for manufacturing urethane resins, etc., using a tank for heating and melting.

Furthermore, the use of the tank for heating and melting is inevitably required to prevent heat radiation from the surface of the tank and piping. Accordingly, it is disadvantageous not only from the viewpoint of energy costs, but also plant costs.

For the purpose of overcoming the above disadvantages, a random copolymer composed of ε-caprolactone and dialkylcarbonate such as diethylcarbonate or dimethylcarbonate had been disclosed in Japanese Publication Laid-open No. 115925/1985 (entitled: A Process for Producing Polyurethane).

The random copolymer is liquid polyol having a low melting temperature.

However a polyurethane prepared with said randomly copolymerized polyol has a disadvantage of being poor in heat and moisture resistibility. Such is thought to be due to ester bonds based on ε-caprolactone in the molecules. The inventors of this invention have now found that it is possible to solve the problems as hereinabove pointed out and produce polyurethanes having high mechanical strength and at and moisture resistibility, and furthermore having improved properties at low temperatures by employing a particular polycarbonatediol composition which has a low melting temperature and excellent processability.

SUMMARY OF THE INVENTION

The present invention has been found as a result of intensive studies in order to develop novel polycarbonatediol compositions and polyurethane resins.

Therefore in accordance with the present invention there is provided a polycarbonatediol composition obtained by reaction of a compound selected from the group consisting of compounds which require dehydrochlorination, alkylene carbonates, diaryl carbonates and dialkyl carbonates, with an aliphatic diol which comprises a mixture of (1) from 20 to 80 mol % of a polyvalent alcohol in which the number of carbon atoms in the main polymer chain is from 3 to 20, and having at least one side chain, and (2) from 80 to 20 mol % of 1,6-hexanediol.

The polycarbonatediol composition of this invention, having the property of being liquid or easily liquified at ordinary temperatures, believed to be attributable to its crystallinity being disordered due to random structures, is composed of 1,6-hexanediol and polyvalent alcohol having at least one side chain.

Accordingly, the disclosed polycarbonatediol composition has more excellent processability in the case of preparing a polyurethane resin, etc.

Also, the polyurethane resins of this invention are prepared by a reaction of an organic diisocyanate compound with the polycarbonatediol composition.

The polyurethane resin of the invention has excellent properties under low temperature conditions, while retaining hiqh levels of mechanical strength, excellent resistibility under high heat and moisture conditions, etc., thereby maintaining a good balance of properties.

The polyurethane resin which is produced in accordance with the present invention is more useful in a very wide variety of forms including spandex, rigid or flexible urethane foams, thermoplastic urethane elastomers and thermosetting urethane elastomers, adhesives, synthetic leather, and paints, etc.

DETAILED DESCRIPTION OF THE INVENTION

The present invention is described below in more detail.

In the polycarbonatediol composition, examples of compounds which require dehydrochlorination include phosgen, bischloroformate, etc.

Alkylene carbonates include ethylene carbonate, 1,2-propylene carbonate, 1,2-butylene carbonate, etc.

Diaryl carbonates include diphenyl carbonate, dinaphtyl carbonate, etc.

Dialkyl carbonates include dimethyl carbonate, diethyl carbonate, etc.

Any of these compounds can be allowed to react with a polyvalent alcohol in which the numbers of carbon atoms in the main polymer chain is from 3 to 20 and having at least one side chain, which is further described below to form a polycarbonatediol composition.

Polyvalent alcohols which can be employed for the purpose of this invention include 1,2-propanediol, 1,3-butanediol, 2-methyl-1,3-propanediol, neopentylglycol, methyl pentanediol, 2,2,4-trimethyl-1,6-hexanediol, 3,3,5-trimethyl-1,6-hexanediol, 2,3,5-trimethyl-1,6-pentanediol, etc.

It is possible to use either one kind of polyvalent alcohol having at least one side chain or a mixture composed of two or more kinds thereof.

A mixture composed of from 20 to 80 mol % of a polyvalent alcohol having at least one side chain and from 80 to 20 mol % of 1,6-hexanediol is allowed to react with a dialkyl carbonate, etc., to produce a polycarbonatediol composition.

If the mixture contains less than 20 mol % of polyvalent alcohol having at least side chain, the resulting polycarbonatediol composition is undesirably high in melting temperature.

On the other hand, if the mixture contains more than 80 mol % of polyvalent alcohol having at least one side chain, the features of 1,6-hexanediol are lost, and no polyurethane that is satisfactory in mechanical strength, etc., can be produced.

In the event that a dialkyl carbonate is used for the purpose of this invention, it is preferable to use dimethyl or diethyl carbonate.

No polyvalent alcohol having at least one side chain is a produced on an industrial basis having less than three carbon atoms.

No desirable polycarbonatediol composition can be produced on an industrial basis, even if any polyvalent alcohol having more than 20 carbon atoms may be employed.

In the case that a dialkyl carbonate compound is used as a carbonate compound, the reaction for the preparation of the polycarbonatediol composition of the present invention is represented by the formula:

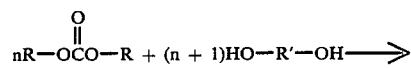

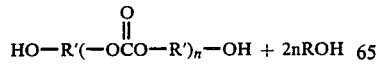

wherein R is an alkyl group, and R' is an alkylene group.

The two kinds of polyvalent alcohols which are used as the starting materials are incorporated into the molecule randomly by a carbonate bond.

If one of them is shown as HO—R$^1$—OH, and the other as HO—R$^2$—OH,

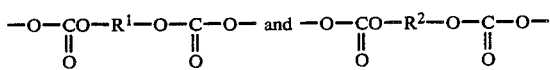

are present randomly in the molecule.

The random combination in the polycarbonatediol composition results in disordered crystallinity, to thus obtain a liquid polycarbonatediol composition. The crystallinity depends on 1,6-hexanediol structures.

Detailed description is set forth below of the reaction process, etc., which are applicable when, for example, a dialkyl carbonate is employed as the material to be reacted with the aliphatic diol comprising a mixture of (1) from 20 to 80 mol % of a polyvalent alcohol in which the number of carbon atoms in the main polymer chain is from 3 to 20 and having at least one side chain, and (2) from 80 to 20 mol % of 1,6-hexanediol.

It is possible to employ for the reaction any catalyst that is conventionally employed for an ester interchange reaction.

More specifically, it is possible to use, for example, a metal such as lithium, sodium, potassium, rubidium, cesium, magnesium, calcium, strontium, barium, zinc, aluminum, titanium, cobalt, germanium, tin, lead, antimony, arsenic, or cecium, or an alkoxide thereof.

Other examples of preferred catalyst include alkali and alkaline earth metal carbonates, zinc borate, zinc oxide, lead silicate, lead carbonate, antimony trioxide, germanium dioxide, cerium trioxide, and aluminum isopropoxide.

Particularly useful catalyst are organic metal compounds such as the magnesium, calcium, cerium, barium, zinc, tin, titanium, or other metal salts of organic acids.

It is generally appropriate to use the catalyst in the amount which is equal to 0.0001 to 1.0%, and preferably 0.001 to 0.2%, of the total weight of the starting materials.

It is preferable to employ a reaction temperature of about from 80° C. to 220° C.

A temperature in the neighborhood of the boiling point of dialkyl carbonate is employed during the initial stage of the reaction, and as the reaction proceeds, the temperature is gradually raised.

A reaction vessel having a distillation column is usually employed to enable the separation of the diol compound which is produced from the dialkyl carbonate employed as the starting material.

The reaction is caused to take place while the dialkyl carbonate is refluxed, and the alcohol which is produced with the progress of the reaction is removed by distillation.

In the event that a part of the dialkyl carbonate is lost by azeotropy with the alcohol which is removed by distillation, it is advisable to take the amount of any such possible loss of dialkyl carbonate into consideration when weighing the starting materials to be charged into the reaction system.

Although it is obvious from the reaction formula which has hereinabove been given that n mols of dialkyl carbonate and (n+1) mols of diol compound define their theoretical molar ratio, it is in practice preferable to employ a molar ratio of dialkyl carbonate to diol compound which is from 1.1 to 1.3 times greater than their theoretical molar ratio.

Although the reaction may be performed at normal pressure, its progress can be promoted if a reduced pressure in the range of, say, 1 to 200 mmHg is employed during its later stage.

The molecular weight of the polycarbonate diol composition which is employed for the purpose of this invention can be adjusted if the molar ratio of the diol compound and the other materials, such as dialkyl or dialkylene carbonate, to be reacted is altered.

In other words, the molecular weight can be adjusted as the value of n in the formula is varied. The polycarbonatediol composition can be hydrated to confirm the structural components by an analysis of hydrated products with gas chromatography or NMR.

On the other hand, the invented polyurethane resin, can be prepared by a reaction of an organic isocyanate compound with the above described polycarbonatediol composition.

Examples of the organic diisocyanate compounds which can be employed include 2,4-tolylene diisocyanate, 2,6-tolylene diisocyanate, 4,4'-diphenylmethane diisocyanate, tolidine diisocyanate, xylene diisocyanate, hydrogenated 4,4'-diphenylmethane diisocyanate, hexamethylene diisocyanate, isophorone diisocyanate, 4,4'-dicyclohexylmethane diisocyanate, 1,5-naphthalene diisocyanate, carbodiimide-modified methylene diisocyanate and xylylene diisocyanate.

One or more compounds are employed.

A chain extender may also be present in the mixture, if desired.

A low-molecular compound having active hydrogen can be used as the chain extender.

Specific examples thereof are ethylene glycol, propylene glycol, 1,4-butylene glycol, 2-methylpropanediol, neopentyl glycol, pentane-diol, 1,6-hexanediol, ethylenediamine, propylenediamine, hydrazine, isophoronediamine, metaphenylenediamine, 4,4,-diaminodiphenylmethane, diaminodiphenylsulfone, and 3,3,-dichloro-4,4,-diaminodiphenylmethane. The manufacture of polyurethanes by this invention can be accomplished either by the prepolymer process in which a polyol and an excess of an organic diisocyanate compound are allowed to react to form a prepolymer having isocyanate group in terminal positions and the prepolymer is allowed to react with a diol, diamine, etc., as a chain extender, or by a one-shot process in which all of the constituents required for making a polyurethane are added simultaneously.

A solvent may or may not be used for performing any such reaction.

If any solvent is used, it is preferable to use an inert one.

Specific examples of the solvents which can be used are toluene, ethyl acetate, butyl acetate, methyl ethyl ketone, dimethylformamide, and tetrahydrofuran.

A catalyst can be employed for promoting the reaction for urethane formation.

It is possible to use as the catalyst, for example, an organic tin compound such as tin octylate or dibutyl-tin dilaurate, or a tertiary amine such as N-methylmorpholine or triethyl amine.

The carbonatediol composition and polyurethane resin of the present invention can be hydrolyzed to analyze partial molecular structure, which composes a mixture of from 20 to 80 mol % of a polyvalent alcohol in which the number of carbon atoms in the main polymer chain is 3 to 20 and having at least one side chain, and (2) from 80 to 20 mol % of 1,6-hexanediol, of the hydrolyzed products by analysis with gas chromatography or an NMR analyzer.

The present invention is further illustrated below by examples.

Synthesis Example 1

A round bottom flask having a capacity of two liters and equipped with a stirrer, a thermometer, and a distillation column having 10 perforated plates was charged with 814 g (9.04 mols) of dimethylcarbonate, 677 g (5.74 mols) of 1,6-hexanediol, 149 g (1.43 mols) of neopentylglycol and 0.16 g of tetrabutyl titanate as a catalyst.

The reaction was performed at normal pressure with the dimethylcarbonate being boiled, and the resulting methanol was removed by distillation.

The temperature of the reaction vessel was gradually raised to 200° C. and when the formation of methanol stopped substantially completely, evacuation of the vessel was started and continued until a reduced pressure of 20 mmHg was ultimately reached, whereby the raw materials were removed by distillation and a reaction product was obtained.

The obtained polycarbonatediol composition was a wax having a hydroxyl number of 56.8 and a melting point of 22° to to 25° C.

Synthesis Example 2

Example 1 was repeated, except that the molar ratio of 1,6-hexanediol to neopentylglycol was changed from 4/1 to 2/1.

Synthesis Example 3

Synthesis Example 2 was repeated, except that neopentylglycol was replaced with an equimolar amount 3-methyl1, 5-pentanediol.

Synthesis Example 4

Synthesis Example 1 was repeated, except that neopentylglycol was replaced with trimethyl-1,6-hexanediol.

Synthesis Example 5

Synthesis Example 2 was repeated, except that neopentylglycol was replaced with am equimolar amount of trimethyl-1,6-hexanediol.

Synthesis Example 6

Synthesis Example 2 was repeated, except that neopentylglycol was replaced with an equimolar amount of 3-methyl-1,5-pentanediol and the molecular weight of the polycarbonatediol composition was changed from 2000 to 1000.

Synthesis Example 7

Synthesis Example 3 was repeated, except that the molecular weight of the polycarbonatediol composition was changed from 2000 to 800.

Synthesis Example 8

Synthesis Example 3 was repeated, except that the molecular weight of the polycarbonatediol composition was changed from 2000 to 500.

Comparative Synthesis Example 1

Synthesis Example 1 was repeated, except that a mixture consisting of 1,6-hexanediol and neopentylglycol was replaced with only 1,6-hexanediol.

Comparative Synthesis Example 2

Comparative Synthesis Example 1 was repeated, except that the molecular weight of the polycarbonatediol composition was changed from 2000 to 1000.

The results obtained in Synthesis Example 1 to 8 and Comparative Synthesis Example 1 and 2 are shown in Table 1.

Table 1 indicates that polycarbonatediol compositions according to the present invention are solids having low melting point range of from 22° to 25° C. or liquid under the temperature of 15° C., whereas the ones according to Comparative Synthesis Examples are solids having melting point range of from 43° to 50° C.

Furthermore, the molecular weights of the polycarbonatediol composition nearly agreed with those calculated based on hydroxyl values.

The carbonatediol compositions obtained in Synthesis Example 1, 6, and 8 were hydrolyzed.

The hydrolyzed products were analyzed with an NMR analyzer and gas chromatograph to confirm the structural components of the carbonatediol compositions, which were copolymerized by 2 kinds of aliphatic diols.

TABLE 1

| | Synthesis Example | | | | | | | | Comparative Synthesis Example | |
|---|---|---|---|---|---|---|---|---|---|---|
| | 1 | 2 | 3 | 4 | 5 | 6 | 7 | 8 | 1 | 2 |
| (A) | NPG | NPG | MPD | TMHD | TMHD | MPD | MPD | MPD | — | — |
| (B) | 2000 | 2000 | 2000 | 2000 | 2000 | 1000 | 800 | 500 | 2000 | 1000 |
| (C) | 4/1 | 2/1 | 2/1 | 4/1 | 2/1 | 2/1 | 2/1 | 2/1 | — | — |
| (D) | 56.8 | 60.9 | 56.9 | 57.4 | 53.6 | 112.1 | 141.5 | 227.2 | 57.8 | 110.5 |
| (E) | 5360 | 5020 | 5010 | 5390 | 6980 | 820 | 480 | 180 | 5760 | 840 |
| (F) | 22~25 | — | — | — | — | — | — | — | 48~50 | 43~45 |
| (G) | wax | liquid | liquid | liquid | liquid | liquid | liquid | liquid | wax | wax |

(A): polyvalent alcohol having side chain
(B): schemed molecular weight
(C): molar ratio of 1,6-hexanediol to (A)
(D): hydroxyl value
(E): viscosity (cp/60° C.)
(F): melting point (°C.)
(G): appearance
NPG: neopentylglycol
MPD: 3-methyl-1,5-pentanediol
TMHD: trimethyl-1,6-hexanediol

EXAMPLES 1 AND 2

Polyurethane resins were synthesized from the polycarbonatediol compositions prepared in Synthesis Examples 1 and 2 and in Comparative Synthesis Example 1, respectively under reaction conditions hereinafter stated. Parts are by weight A polyurethane film having a thickness of 150 microns was formed from each polyurethane resin and examined for physical properties.

Reaction Conditions for the Synthesis of Polyurethane resins

| (1) Component: | |
|---|---|
| Polyol | 100 parts |
| 1,4-BG | 8.3 parts |
| MDI | 35.6 parts |
| Solvent (DMF) | 267.3 parts |

(Note)
Polyol (Mw2000)/1,4-BG/MDI
NCO/OH = 1.03
1,4-BG/polyol = 2.0
1,4-BG: 1,4-butanediol
MDI: methylene diisocyanate
DMF: dimethyl formamide (2) Reaction Steps A reaction vessel was charged with 100 parts of polyol, 8.3 parts of 1,4-BG and 144 parts of solvent and heated to a temperature of 60° C.

Then, the vessel was charged with 35.6 parts of MDI and further heated.

When the temperature had dropped to 60° C., the vessel was additionally charged with 123.3 parts of solvent, and aging was allowed to take place at that temperature.

(3) Properties of Polyurethane resins

| NV (%) | 35 |
|---|---|
| Viscosity (cp at 25° C.) | 60,000 to 80,000 |
| Solvent | DMF |

(4) Formation of Film

A polyurethane resin solution was coated onto a sheet of release paper and dried to form a film having a thickness of 150 microns.

(5) Examination of Physical Properties

JIS K6301 (Physical Testing Methods for Vulcanized Rubber) #3 dumbbell specimens were formed from each film and were examined for physical properties using a Shimadzu autograph (model PCS-5000)

The results obtained in Examples 1 and 2 and in the Comparative Example are shown in Table 2.

Table 2 indicates that polyurethane resins synthesized

TABLE 2

| | Example 1 | Example 2 | Comparative Example |
|---|---|---|---|
| 100% modulus (kgf/cm$^2$) | 63 | 92 | 69 |
| 300% modulus (kgf/cm$^2$) | 205 | 574 | 410 |
| strength (kgf/cm$^2$) | 622 | 653 | 652 |
| elongation (%) | 445 | 330 | 400 |
| 100% modulus at −10° C. (kgf/cm$^2$) | 114 | 490 | 113 |
| 300% modulus at −10° C. (kgf/cm$^2$) | 508 | — | 550 |
| 100% modulus at −30° C. (kgf/cm$^2$) | 419 | 580 | 403 |

When the invention has been described in detail and with references to specific examples thereof, it will be apparent to one skilled in the art that various changes and modifications can be made therein without departing from the spirit and scope thereof.

What is claimed is:

1. A polycarbonatediol composition obtained by reaction in the absence of a solvent and in the presence of a catalyst of a compound selected from the group consisting of alkylene carbonates, diaryl carbonates and dialkyl carbonates, with an aliphatic diol which comprises a mixture of (1) from 20 to 80 mol % of a polyvalent alcohol in which the number of carbon atoms in the main polymer chain is from 3 to 20 and having at least one side chain, and (2) from 80 to 20 mol % of 1,6-hexanediol 2. A polycarbonatediol composition according to claim 1 wherein said polyvalent alcohol having at least one side chain is neopentylglycol.

3. A polycarbonatediol composition according to claim 1 wherein said polyvalent alcohol having at least one side chain is trimethyl-1,6-hexanediol.

4. A polycarbonatediol composition according to claim 1 wherein said polyvalent alcohol having at least one side chain is 3-methyl-l,5-pentanediol.

5. A polycarbonatediol composition according to claim 1 wherein the mixing ratio of 1,6-hexane diol to polyvalent alcohol having at least one side chain is 4/1.

6. A polycarbonatediol composition according to claim 1 wherein the mixing ratio of 1,6-hexane diol to polyvalent alcohol having at least one side chain is 2/1.

7. A polycarbonatediol composition according to claim 1 wherein the dialkyl carbonate is dimethyl carbonate or diethyl carbonate.

8. A polyurethane resin prepared by reaction in the absence of a solvent and in the presence of a catalyst of an organic diisocyanate compound with a polycarbonatediol composition obtained by reaction of a compound selected from the group consisting of alkylene carbonates, diaryl carbonates and dialkyl carbonates, with an aliphatic diol which comprises a mixture of (1) from 20 to 80 mol % of a polyvalent alcohol in which the number of carbon atoms in the main polymer chain is from 3 to 20 and having at least one side chain, and (2) from 80 to 20 mole % of 1,6-hexanediol.

* * * * *